(No Model.)
H. L. SIMMONS.
RAIL BRAKE.
No. 513,207. Patented Jan. 23, 1894.
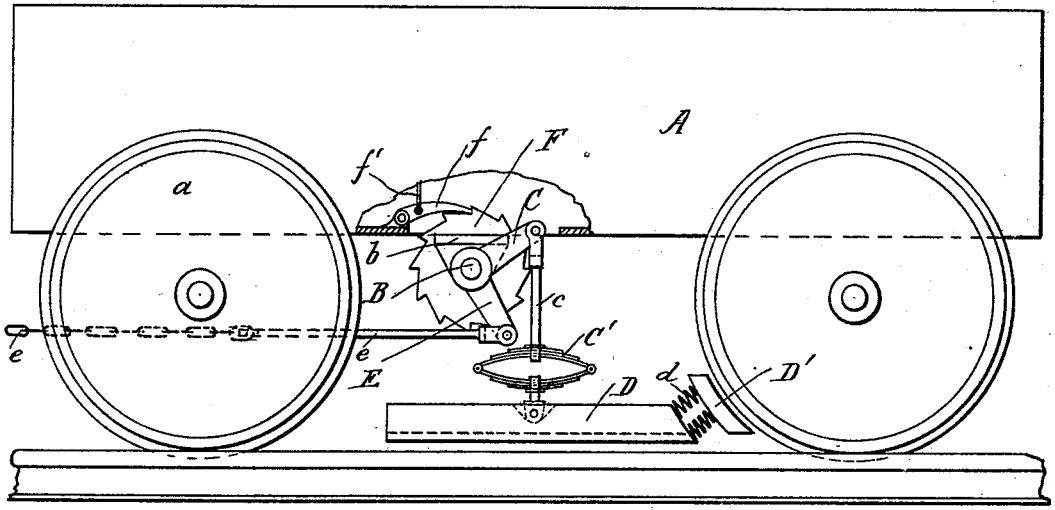
FIG_1_
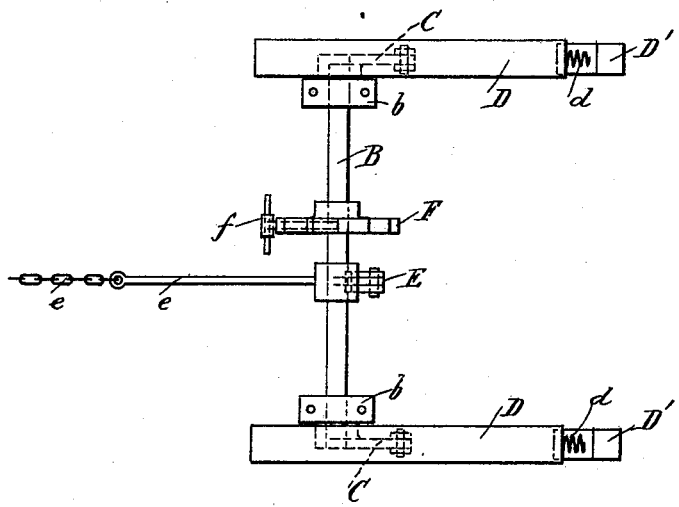
FIG_2_
WITNESSES:
Walter Allen
Van Buren Hillyard.
INVENTOR
Henry L. Simmons
BY
Herbert W. T. Jenner.
ATTORNEY.

UNITED STATES PATENT OFFICE.

HENRY L. SIMMONS, OF WICKES, MONTANA.

RAIL-BRAKE.

SPECIFICATION forming part of Letters Patent No. 513,207, dated January 23, 1894.

Application filed June 7, 1893. Serial No. 476,837. (No model.)

*To all whom it may concern:*

Be it known that I, HENRY L. SIMMONS, residing at Wickes, in the county of Jefferson and State of Montana, have invented certain new and useful Improvements in Rail-Brakes; and I do hereby declare the following to be a full, clear, and exact description of the invention, such as will enable others skilled in the art to which it appertains to make and use the same.

This invention relates to brakes for railroad vehicles; and it consists in the novel construction and combination of the parts hereinafter fully described and claimed.

In the drawings: Figure 1 is a side view of a portion of a railroad car provided with a brake according to this invention. Fig. 2 is a plan view, from below, of the brake mechanism.

A is a portion of the frame of any railroad vehicle, such as a car, truck or engine, and $a$ are its wheels.

B is a transverse shaft journaled in the brackets $b$ under the frame A.

C are arms secured to the ends of the shaft B, and $c$ are suspension rods pivoted to the said arms.

D are the track brake-shoes secured to the said suspension rods. C' are springs secured to the said suspension rods and interposed between the brake-shoes and the arms C.

D' are wheel brake-shoes supported by the rear ends of the track brake-shoes. Springs $d$ are interposed between the wheel brake-shoes and the ends of the shoes D, but these springs may be omitted if desired.

The faces of the track brake-shoes are grooved to fit the tops of the rails upon which they bear, and the form of the grooves is variously modified to suit the different kinds of rails.

The car or other vehicle is stopped very quickly by depressing the track brake-shoes. The friction of the track brake-shoes against the rails causes the wheel brake-shoes to be pressed against the wheels, which in turning increase the pressure of the rear ends of the track brake-shoes upon the rails. The springs guard against derailment, and release the shoes from the grip of the wheels and rails when the car is brought to a stop. Any approved mechanism may be used for depressing the brake-shoes, such as a pneumatic or steam cylinder, or they may be depressed by hand.

E is an arm secured to the shaft B at a right angle to the arms C, and $e$ is a rod or chain pivoted to the arm E. The rod $e$ passes longitudinally under the car and may be pulled upon in any approved manner.

F is a ratchet wheel secured on the shaft B, and $f$ is a pawl engaging with the wheel F. A rod $f'$ is provided for raising the pawl out of gear when required. The ratchet wheel and pawl hold the brakes hard on when the rod $e$ is pulled to depress the track brake shoes.

What I claim is—

1. The combination, with the revoluble transverse shaft, and the arms secured to the shaft; of the track brake-shoes pivotally suspended from the said arms, the springs interposed between the said shoes and arms, the wheel brake-shoes at the ends of the track brake-shoes, and operating devices for depressing the track brake-shoes, substantially as set forth.

2. The combination, with the pivotally-suspended track brake-shoes, and operating devices for depressing them; of the wheel brake-shoes, and the springs interposed between the said wheel brake-shoes and the rear ends of the track brake-shoes, substantially as set forth.

3. The combination, with the revoluble transverse shaft, and the arms C and E secured thereto; of the track brake-shoes pivotally suspended from the arms C, the springs interposed between the said shoes and arms C, the wheel brake-shoes at the ends of the track brake-shoes, an operating rod or chain connected to the arm E, a ratchet wheel secured on the said shaft, and a pivoted retaining pawl engaging with the said ratchet wheel, substantially as and for the purpose set forth.

In testimony whereof I affix my signature in presence of two witnesses.

HENRY L. SIMMONS.

Witnesses:
W. D. SCOTT,
ALBERT PRYOR.